US012042895B2

United States Patent
Ikai et al.

(10) Patent No.: US 12,042,895 B2
(45) Date of Patent: Jul. 23, 2024

(54) SPINDLE VIBRATION MEASURING SYSTEM, SPINDLE VIBRATION MEASURING METHOD, AND PROGRAM

(71) Applicant: FANUC CORPORATION, Yamanashi (JP)

(72) Inventors: Satoshi Ikai, Yamanashi (JP); Daisuke Uenishi, Yamanashi (JP); Yuanming Xu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1124 days.

(21) Appl. No.: 16/788,012

(22) Filed: Feb. 11, 2020

(65) Prior Publication Data
US 2020/0306914 A1 Oct. 1, 2020

(30) Foreign Application Priority Data
Mar. 25, 2019 (JP) .................................. 2019-056918

(51) Int. Cl.
B23Q 17/12 (2006.01)
B23Q 17/00 (2006.01)
B23Q 17/10 (2006.01)

(52) U.S. Cl.
CPC .......... B23Q 17/12 (2013.01); B23Q 17/003 (2013.01); B23Q 17/10 (2013.01)

(58) Field of Classification Search
USPC ....................................................... 700/175
See application file for complete search history.

(56) References Cited

U.S. PATENT DOCUMENTS 6,604,013 B1* 8/2003 Hamidieh .......... G05B 19/4065
700/174
2004/0179915 A1* 9/2004 Hill ...................... G05B 19/406
409/141
(Continued)

FOREIGN PATENT DOCUMENTS

CN 101417398 A 4/2009
CN 103079757 A 5/2013
(Continued)

OTHER PUBLICATIONS

Goto, Junya; Notice of Reasons for Refusal; Japanese Patent Application No. 2019-056918; dated Aug. 3, 2021; 4 pages.
(Continued)

Primary Examiner — Mohammad Ali
Assistant Examiner — Joshua T Sanders
(74) Attorney, Agent, or Firm — Renner, Otto, Boisselle & Sklar LLP

(57) ABSTRACT

A spindle vibration measuring system which measures vibration of a spindle in a machining device that performs a cutting or abrading process on a workpiece. The machining device has a workpiece holder that holds the workpiece, the spindle that holds a tool, and a moving mechanism that relatively moves the workpiece holder and the spindle. The spindle vibration measuring system acquires positional variation data or vibration data of the moving mechanism when the spindle rotates, and a result related to vibration of the spindle to output or store based on the positional variation data or the vibration data.

15 Claims, 10 Drawing Sheets

(56) References Cited

U.S. PATENT DOCUMENTS

| | | | |
|---|---|---|---|
| 2009/0030545 A1* | 1/2009 | Masuya | B23Q 17/12 700/175 |
| 2009/0110499 A1* | 4/2009 | Inagaki | F16F 15/002 408/143 |
| 2014/0262392 A1 | 9/2014 | Petrossians et al. | |
| 2015/0352679 A1 | 12/2015 | Yamamoto et al. | |
| 2016/0147212 A1* | 5/2016 | Kurosumi | B23Q 15/08 700/160 |
| 2016/0341631 A1* | 11/2016 | Kamiya | G01M 13/04 |
| 2017/0153208 A1 | 6/2017 | Kawai et al. | |

FOREIGN PATENT DOCUMENTS

| | | |
|---|---|---|
| CN | 106020129 A | 10/2016 |
| CN | 106181725 A | 12/2016 |
| JP | H06-241952 A | 9/1994 |
| JP | 2000-121426 A | 4/2000 |
| JP | 2005-074545 A | 3/2005 |
| JP | 2009-044947 A | 2/2009 |
| JP | 4542014 B2 | 9/2010 |
| JP | 2011-200998 A | 10/2011 |
| JP | 2013-002825 A | 1/2013 |
| JP | 2013-034375 A | 2/2013 |
| JP | 2014-172107 A | 9/2014 |
| JP | 2016-052692 A | 4/2016 |
| JP | 2017-094463 A | 6/2017 |
| TW | 201634176 A | 10/2016 |
| WO | 2013073436 A1 | 5/2013 |
| WO | WO-2015/140905 A1 | 9/2015 |

OTHER PUBLICATIONS

Industrial Property Cooperation Center; Search Report by Registered Search Organization; Japanese Patent Application No. 2019-056918; dated Jun. 25, 2021; 13 pages.

* cited by examiner

FIG. 6

| TYPE OF TOOL | ROTATION SPEED RANGE WITH SMALL VARIATION |
|---|---|
| A | EQUAL TO OR LESS THAN 5000 rpm |
|   | 13000~14000rpm |
|   | 16500~17500rpm |
| B |   |

FIG. 7

| TYPE OF TOOL | ROTATION SPEED RANGE WITH SMALL VARIATION | MACHINING QUALITY DATA |
|---|---|---|
| A | EQUAL TO OR LESS THAN 5000 rpm | 5 (4500rpm) |
|   | 13000~14000rpm | 2 (13000rpm) |
|   | 16500~17500rpm | — |
| B |   |   |

SPINDLE VIBRATION MEASURING SYSTEM, SPINDLE VIBRATION MEASURING METHOD, AND PROGRAM

CROSS-REFERENCE TO RELATED APPLICATIONS

This application is based on and claims priority to Japanese Patent Application No. 2019-056918 filed on Mar. 25, 2019, the entire content of which is incorporated herein by reference.

TECHNICAL FIELD

The present invention relates to spindle vibration measuring systems, spindle vibration measuring methods, and programs.

BACKGROUND ART

In recent years, high-quality appearance of machined components, such as information technology (IT) components and decorative components, is often performed by using cutting machines, such as machining centers. In such machining, for example, monocrystalline diamond and polycrystalline diamond (PCD) are used, and it is desirable that spindle vibration be minimized and high-precision positioning be performed.

With regard to a machining device that performs normal machining instead of high-quality machining, a known technology involves attaching an X-axis Y-axis accelerometer to a spindle head and vibrating an area near the accelerometer by using an impact hammer, thereby obtaining the vibration characteristics of the spindle head (e.g., see Patent Literature 1).

CITATION LIST

Patent Literature

{PTL 1}
Japanese Unexamined Patent Application, Publication No. 2011-200998

SUMMARY OF INVENTION

A first aspect of the present invention provides a spindle vibration measuring system that measures vibration of a spindle in a machining device that performs a cutting or abrading process on a workpiece, the machining device having a workpiece holder that holds the workpiece, the spindle that holds a tool, and a moving mechanism that relatively moves the workpiece holder and the spindle, the spindle vibration measuring system including: a data acquisition unit which acquires positional variation data or vibration data of the moving mechanism when the spindle rotates; and a processing unit which outputs or stores a result related to vibration of the spindle based on the positional variation data or the vibration data.

A second aspect of the present invention provides a spindle vibration measuring method for measuring vibration of a spindle in a machining device that performs a cutting or abrading process on a workpiece, the machining device having a workpiece holder that holds the workpiece, the spindle that holds a tool, and a moving mechanism that relatively moves the workpiece holder and the spindle, the spindle vibration measuring method including: vibration-data acquisition for acquiring positional variation data or vibration data of the moving mechanism when the spindle rotates; and result derivation of deriving a result related to vibration of the spindle based on the positional variation data or the vibration data.

A third aspect of the present invention provides a program causing a computer to execute a spindle vibration measuring process for measuring vibration of a spindle in a machining device that performs a cutting or abrading process on a workpiece, the machining device having a workpiece holder that holds the workpiece, the spindle that holds a tool, and a moving mechanism that relatively moves the workpiece holder and the spindle, the program is configured to cause the computer to execute: vibration-data acquisition for acquiring positional variation data or vibration data of the moving mechanism when the spindle rotates; and result derivation for deriving a result related to vibration of the spindle based on the positional variation data or the vibration data.

BRIEF DESCRIPTION OF DRAWINGS

FIG. 6 is a table of rotation-speed-range data stored by the spindle vibration measuring system according to the first embodiment.

FIG. 7 is a table of rotation-speed-range data stored by the spindle vibration measuring system according to the first embodiment.

DESCRIPTION OF EMBODIMENTS

A spindle vibration measuring system according to a first embodiment of the present invention will be described below with reference to the drawings. The spindle vibration measuring system is for measuring vibration of a spindle 120 in a machining device 100 that performs a mirror-finishing process on a workpiece W by cutting or abrading the workpiece W.

The machining device 100 may be, for example, a miller, a lathe, a numerically controlled (NC) miller, an NC lathe, a drilling device, or an abrasive device that performs an abrading process on the workpiece W by using a tool 120c held by the spindle 120. The machining device 100 according to this embodiment is a known NC miller for mirror-finishing the surface of the workpiece W by using a cutting blade.

Figure 1:
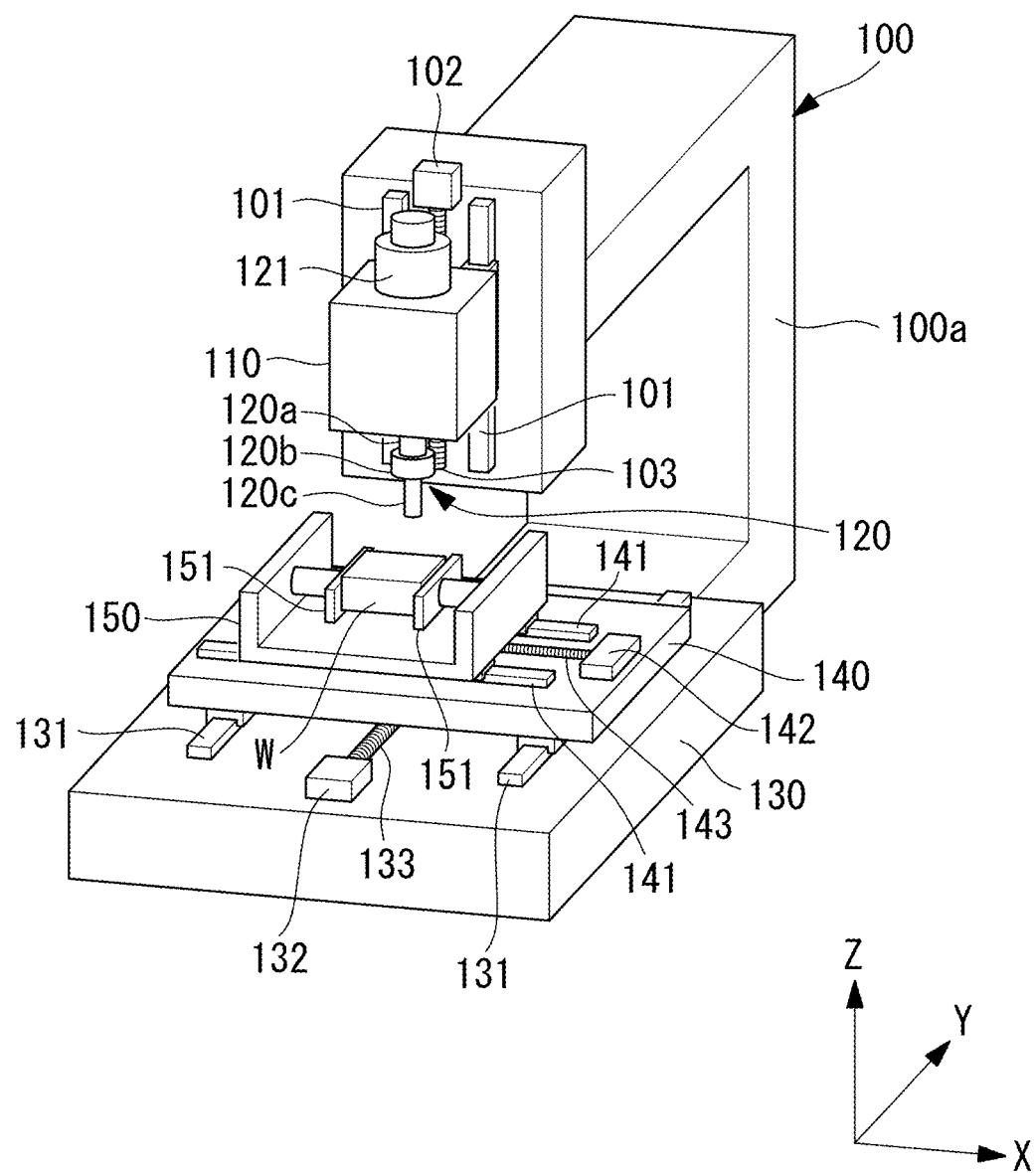
FIG. 1 is a perspective view of a machining device to be subjected to measurement by a spindle vibration measuring system according to a first embodiment of the present invention.

As illustrated in FIG. 1, the machining device 100 has a spindle support 110 provided at the upper end of a frame 100a, the spindle 120 attached to the spindle support 110 in a rotatable manner about the vertical axis, a spindle motor 121 for rotating the spindle 120, a base 130 fixed to the frame 100a and disposed below the spindle 120, a pair of rails 131 fixed to the upper surface of the base 130, a movable member 140 supported by the pair of rails 131, a pair of rails 141 fixed to the upper surface of the movable member 140, and a workpiece holder 150 supported by the pair of rails 141. The workpiece holder 150 secures the workpiece W by using a chuck 151.

The spindle 120 includes a spindle body 120a supported by the spindle support 110 in a rotatable manner about the vertical axis by using, for example, a bearing, and also includes a tool holder 120b provided on the lower portion of the spindle body 120a. The tool holder 120b holds the tool 120c having a cutting blade, such as an end mill or a drill. Although the tool 120c is regarded as being a part of the spindle 120 in this embodiment, the tool 120c may be regarded as being attached to the spindle 120. Alternatively, the tool 120c may be another tool having an abrasive tip.

As illustrated in FIG. 1, the pair of rails 131 extend along a Y axis, and the pair of rails 141 extend along an X axis. The X axis and the Y axis extend in the horizontal direction, and the X axis and the Y axis are orthogonal to each other. Furthermore, a Z axis extends in the vertical direction. Therefore, the workpiece W and the workpiece holder 150 are movable in the X-axis direction along the pair of rails 141, and the workpiece W, the workpiece holder 150, and the movable member 140 are movable in the Y-axis direction along the pair of rails 131.

An X-axis motor 142, such as a servo motor, is fixed on the movable member 140, and a ball screw 143 rotated by the X-axis motor 142 is provided on the movable member 140. The ball screw 143 is disposed parallel to the pair of rails 141. The workpiece holder 150 has a ball screw nut (not illustrated) at the lower surface thereof, and the lower surface of the workpiece holder 150 is meshed with the ball screw 143.

The pair of rails 141, the X-axis motor 142, the ball screw 143, and the ball screw nut function as a moving mechanism that relatively moves the workpiece holder 150 and the spindle 120.

A Y-axis motor 132, such as a servo motor, is fixed on the base 130, and a ball screw 133 rotated by the Y-axis motor 132 is provided on the base 130. The ball screw 133 is disposed parallel to the pair of rails 131. The movable member 140 has a ball screw nut (not illustrated) at the lower surface thereof, and the lower surface of the movable member 140 is meshed with the ball screw 133.

The pair of rails 131, the Y-axis motor 132, the ball screw 133, and the ball screw nut function as a moving mechanism that relatively moves the workpiece holder 150 and the spindle 120.

Therefore, the workpiece W and the workpiece holder 150 are moved in the X-axis direction and the Y-axis direction by the X-axis motor 142 and the Y-axis motor 132.

A pair of rails 101 are fixed to the upper end side of the frame 100a. The pair of rails 101 extend in the vertical direction (i.e., a direction parallel to the Z axis). The spindle support 110 is supported by the pair of rails 101 in a vertically movable manner.

A Z-axis motor 102, such as a servo motor, is fixed to the upper end side of the frame 100a, and a ball screw 103 rotated by the Z-axis motor 102 is provided at the upper end side of the frame 100a. The ball screw 103 is disposed parallel to the pair of rails 101. The spindle support 110 has a ball screw nut (not illustrated) at a side surface thereof, and the side surface of the spindle support 110 is meshed with the ball screw 103.

Therefore, the spindle support 110 and the spindle 120 are moved in the vertical direction by the Z-axis motor 102.

The pair of rails 101, the Z-axis motor 102, the ball screw 103, and the ball screw nut function as a moving mechanism that relatively moves the workpiece holder 150 and the spindle 120.

The spindle motor 121, the X-axis motor 142, the Y-axis motor 132, and the Z-axis motor 102 are controlled by a controller 200 of the machining device 100.

Figure 2:
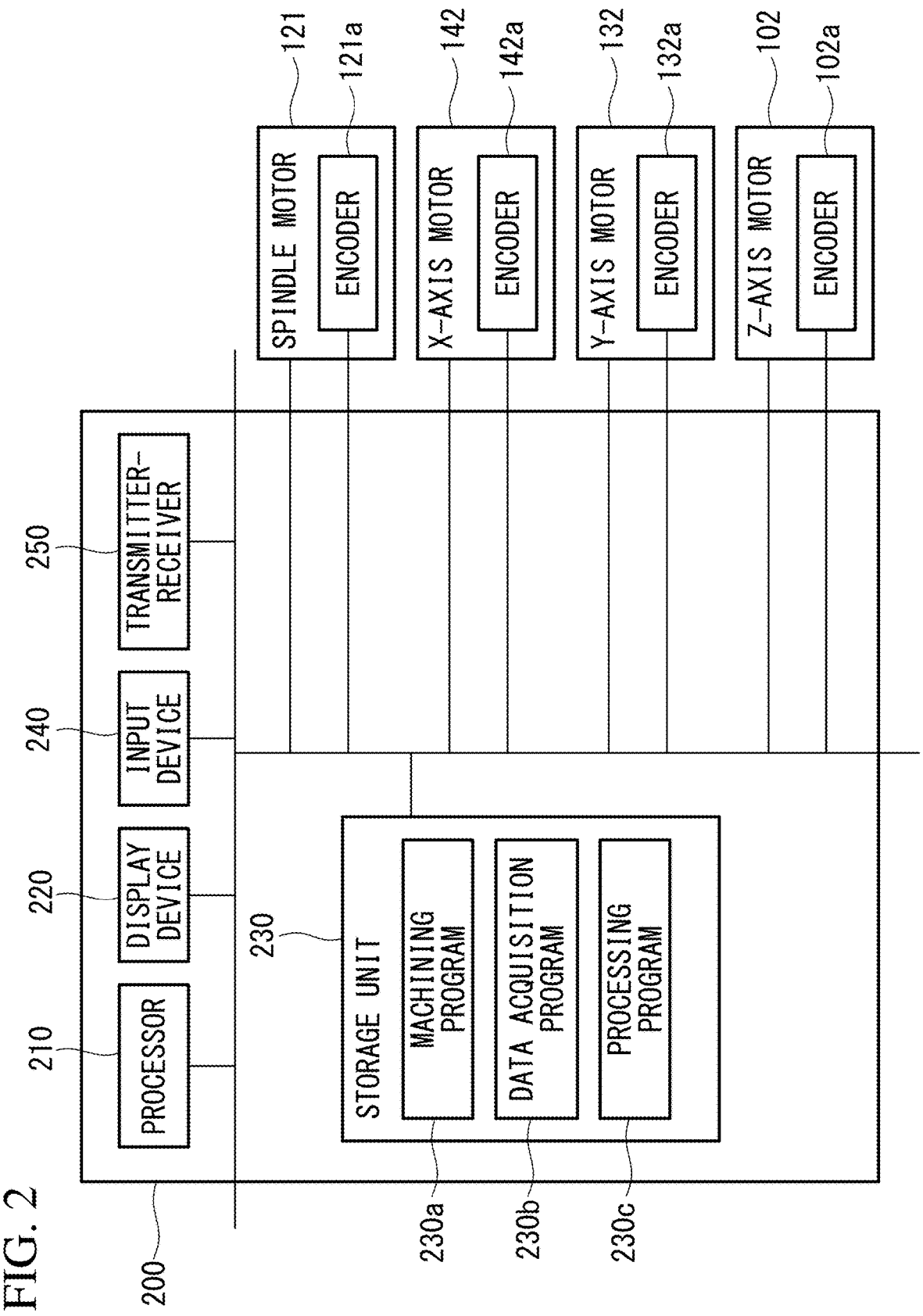
FIG. 2 is a block diagram of a controller of the spindle vibration measuring system according to the first embodiment.

As illustrated in FIG. 2, the controller 200 includes a processor 210, such as a central processing unit (CPU), a display device 220, a storage unit 230 having a nonvolatile storage unit, a read-only memory (ROM), and a random access memory (RAM), an input device 240 having a keyboard, a touchscreen, an operation panel, and a teaching pendant, and a transmitter-receiver 250 for transmitting and receiving signals. The transmitter-receiver 250 also functions as an input unit since it receives information from, for example, a tablet terminal and inputs the received information to the controller 200.

As illustrated in FIG. 2, the X-axis motor 142, the Y-axis motor 132, and the Z-axis motor 102 include encoders 142a, 132a, and 102a, respectively. The controller 200 is connected to the encoders 142a, 132a, and 102a. The encoders 142a, 132a, and 102a detect the rotational positions of the shafts of the X-axis motor 142, the Y-axis motor 132, and the Z-axis motor 102, respectively. The encoders 142a, 132a, and 102a may be provided outside the X-axis motor 142, the Y-axis motor 132, and the Z-axis motor 102 instead of being provided therein. In the configuration described below, electric-current detection values of the X-axis motor 142, the Y-axis motor 132, and the Z-axis motor 102 may be used instead of detection values of the encoders 142a, 132a, and 102a.

As illustrated in FIG. 2, the spindle motor 121 includes an encoder 121a, and the controller 200 is connected to the encoder 121a. The encoder 121a detects, for example, the rotation speed and the rotational position of the spindle 120. The encoder 121a may be provided outside the spindle motor 121 instead of being provided therein. Furthermore, a tachometer may be used in place of the encoder 121a.

The storage unit 230 has a machining program 230a stored therein. For machining the workpiece W, the controller 200 controls the spindle motor 121, the X-axis motor 142, the Y-axis motor 132, and the Z-axis motor 102 based on the machining program 230a. In this case, the controller 200 performs, for example, feedback control and feedforward control by using detection values of the encoders 121a, 142a, 132a, and 102a.

Next, the spindle vibration measuring system will be described below. The spindle vibration measuring system has, for example, a data acquisition program (data acquisition unit) 230b and a processing program (processing unit) 230c that are stored in the storage unit 230 of the controller 200. In this embodiment, these programs 230b and 230c are stored in the storage unit 230 and are executed by the processor 210, so that the processor 210 or the controller 200 serves as a part of the spindle vibration measuring system. These programs 230b and 230c may be stored in a storage unit of a computer separate from the controller 200, and the programs 230b and 230c may be executed by a processor of the computer.

Furthermore, the spindle vibration measuring system according to this embodiment uses or has the encoders 142a, 132a, and 102a.

Figure 3:
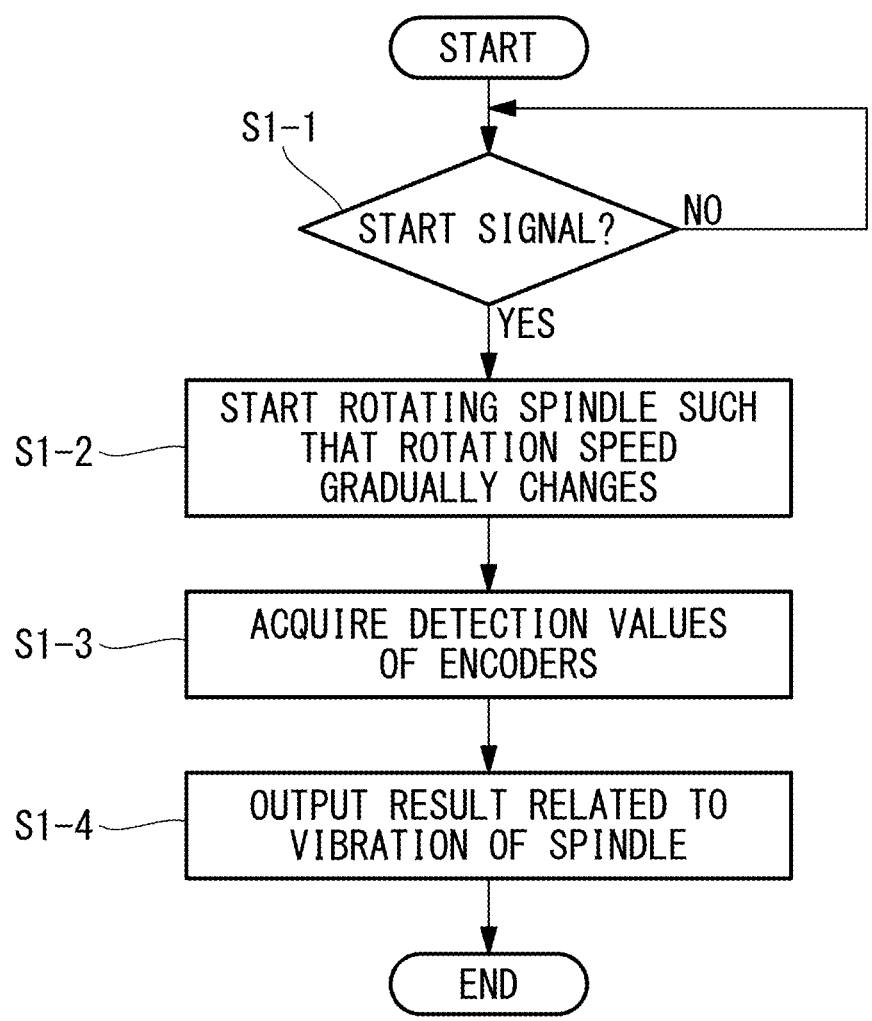
FIG. 3 is a flowchart illustrating control performed by the controller of the spindle vibration measuring system according to the first embodiment.

A process executed by the processor 210 based on the data acquisition program 230b and the processing program 230c will be described below with reference to a flowchart in FIG. 3.

First, in a state where the tool 120c of the spindle 120 is not in contact with the workpiece W, when the processor 210 receives a start signal based on an input to the input device 240 or a start signal received by the transmitter-receiver 250 (step S1-1), the processor 210 starts to rotate the spindle 120 based on the data acquisition program 230b (step S1-2). In step S1-2, the rotation speed of the spindle 120 is gradually changed. In detail, the rotation speed of the spindle 120 is gradually changed from a predetermined low rotation speed to a predetermined high rotation speed. The predetermined low rotation speed is, for example, 0 rpm, and the predetermined high rotation speed is, for example, 24,000 rpm. Alternatively, the rotation speed of the spindle 120 may be gradually changed from the predetermined high rotation speed to the predetermined low rotation speed.

In this case, based on the data acquisition program 230b, the processor 210 acquires detection values of the encoder 142a and the encoder 132a so as to correspond to the rotation speed of the spindle 120 (step S1-3). Accordingly, rotational-position variation data of the shafts of the X-axis motor 142 and the Y-axis motor 132 are acquired. The X-axis motor 142 and the Y-axis motor 132 are provided for moving the workpiece W and the workpiece holder 150 in the X-axis direction and the Y-axis direction. Therefore, the rotational-position variation data may also be regarded as positional variation data of the workpiece W and the workpiece holder 150 in the horizontal direction relative to the spindle 120. The horizontal direction is orthogonal to the axial direction of the spindle 120.

The data acquisition of the spindle 120 and the encoders 142a and 132a is performed per unit time so that the rotation speed and the positional variation data can be associated with each other. For example, by setting the unit time to 1 ms, frequency components up to 500 Hz can be accurately measured.

In addition, in step S1-3, the processor 210 may acquire a detection value of the encoder 102a so as to correspond to the rotation speed of the spindle 120. Accordingly, rotational-position variation data of the shaft of the Z-axis motor 102 is acquired. The Z-axis motor 102 is provided for moving the spindle 120 in the vertical direction (i.e., the Z-axis direction) relative to the workpiece W. Therefore, the rotational-position variation data may also be regarded as positional variation data of the workpiece W and the spindle 120 in the vertical direction. The vertical direction is the axial direction of the spindle 120.

The data acquisition of the spindle 120 and the encoder 102a is performed per unit time so that the rotation speed and the positional variation data can be associated with each other.

Figure 4:
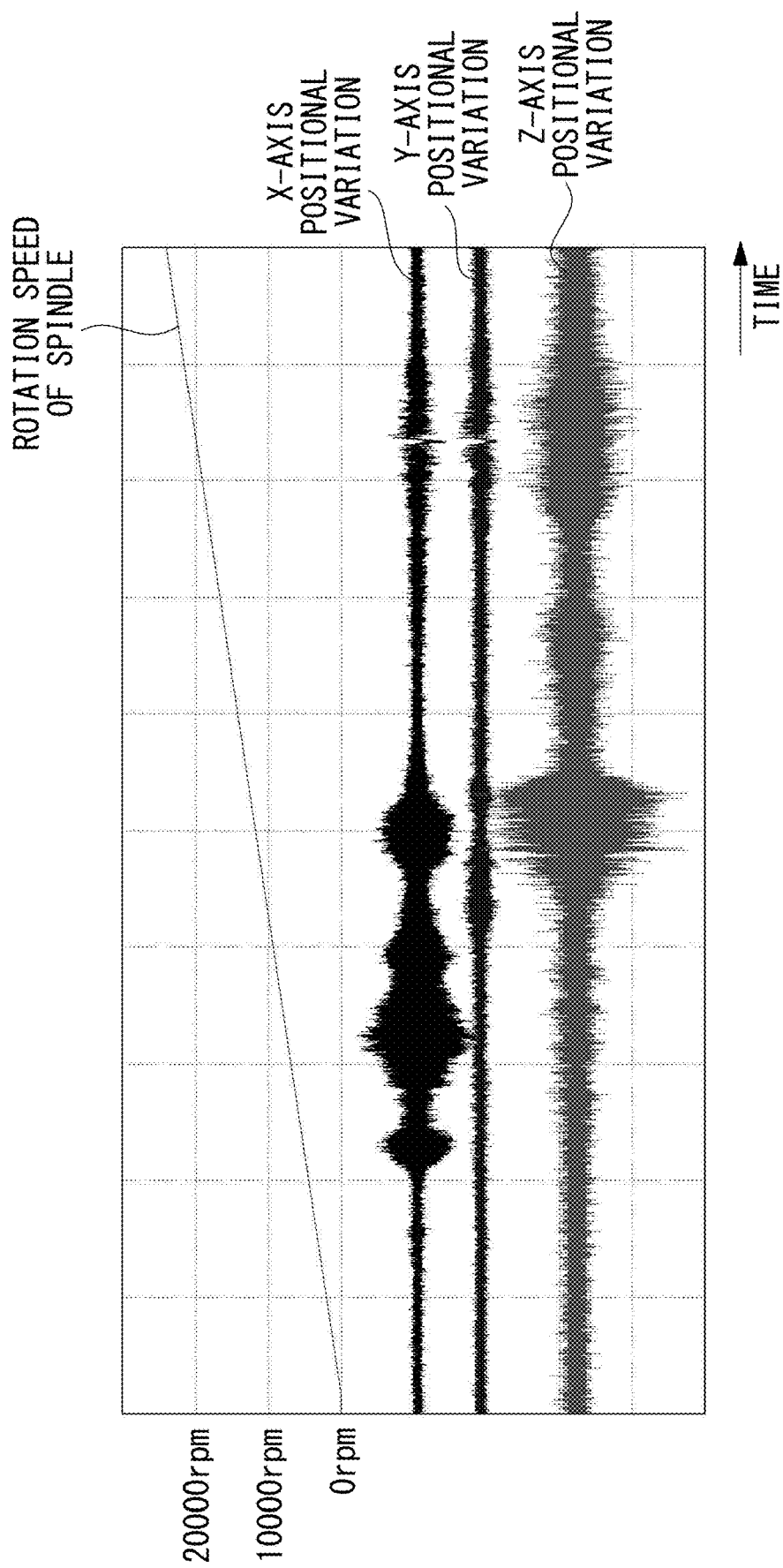
FIG. 4 is a chart illustrating an example of positional variation data obtained by the spindle vibration measuring system according to the first embodiment.

An example of the data acquired in step S1-3 is illustrated in FIG. 4. In FIG. 4, the abscissa axis indicates time, and an X-axis positional variation as a detection value of the encoder 142a, a Y-axis positional variation as a detection value of the encoder 132a, and a Z-axis positional variation as a detection value of the encoder 102a are illustrated. Moreover, FIG. 4 also illustrates the rotation speed of the spindle 120 that gradually changes with time.

As illustrated in FIG. 4, in a certain rotation speed range of the spindle 120, specifically, in a range from 5,000 rpm to 12,000 rpm, the X-axis positional variation increases intermittently. In another rotation speed range of the spindle 120, specifically, in a range of 18,000 rpm or higher, the X-axis positional variation slightly increases. In a range from 6,000 rpm to 12,000 rpm, a range from 15,000 rpm to 16,000 rpm, and a range of 18,000 rpm or higher, the Z-axis positional variation increases. Furthermore, in a range from 9,500 rpm to 12,000 rpm and a range of 18,000 rpm or higher, the Y-axis positional variation increases. As illustrated in FIG. 4, each positional variation can be regarded as vibration since it is a variation centered on a predetermined center position.

Subsequently, the processor 210 performs an output of a result related to vibration of the spindle 120 based on the processing program 230c (step S1-4).

For example, if the X-axis positional variation has a large effect on the mirror-finishing process of the workpiece W, a first example of the output involves outputting data for displaying the X-axis positional variation illustrated in FIG. 4 from the processor 210 to the display device 220 and displaying the X-axis positional variation on the display device 220. Instead of using the X-axis positional variation, for example, the Y-axis positional variation, the Z-axis positional variation as a positional variation of the spindle 120 in the axial direction, both the X-axis positional variation and the Y-axis positional variation, a positional variation in a direction orthogonal to the axial direction of the spindle 120 obtained by combining the X-axis positional variation and the Y-axis positional variation, or a positional variation obtained by combining the X-axis positional variation, the Y-axis positional variation, and the Z-axis positional variation may be used. The same applies to the following description. In the following description, these positional vibrations will be simply referred to as "positional variations". In the first example, the processor 210 may transmit data for displaying the positional variations to another computer provided with a display.

As a second example of the output, the processor 210 may obtain an analysis result (FIG. 5) by performing an analysis, such as a frequency analysis, on the positional variation data in FIG. 4 which is expressed as a time function, to express the result as a function of the rotation speed of the spindle 120 or the frequency by using, for example, the Fourier transform, and may output data for displaying the analysis result to the display device 220 or the other computer. In a chart illustrated in FIG. 5, the abscissa axis indicates the rotation speed of the spindle 120, and the ordinate axis indicates the magnitude (i.e., amplitude) of a positional variation.

Figure 5:
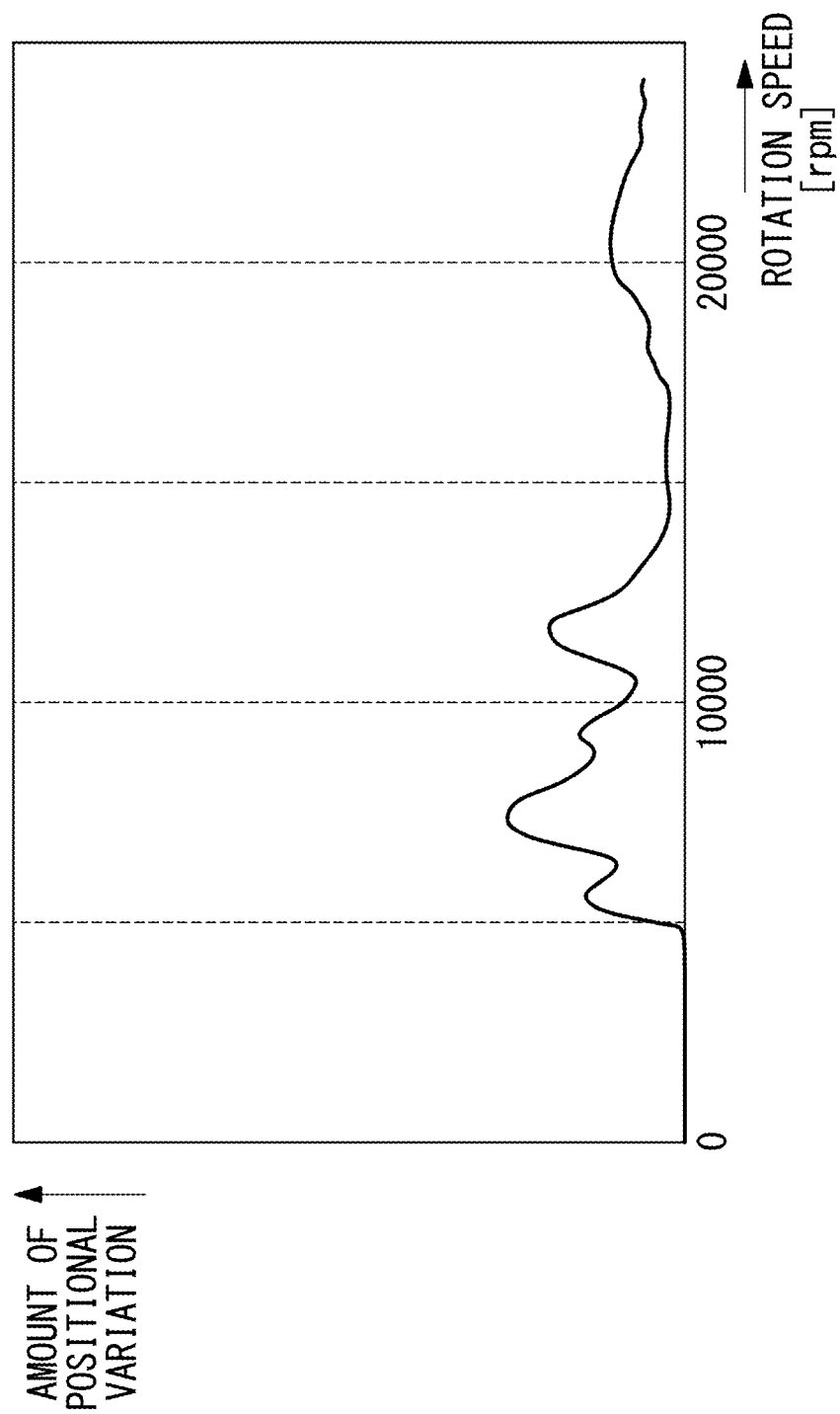
FIG. 5 is a chart illustrating an example of an analysis result obtained by the spindle vibration measuring system according to the first embodiment.

The displayed analysis result may be the chart illustrated in FIG. 5, a rotation speed range of the spindle 120 in which the positional variation is smaller than or equal to a predetermined threshold value in the chart, a rotation speed range of the spindle 120 in which the positional variation exceeds the predetermined threshold value in the chart, or the like. For example, data for rotation speed ranges of 5,000 rpm or lower, between 13,000 rpm and 14,000 rpm inclusive, and between 16,500 rpm and 17,500 rpm inclusive, as the rotation speed range of the spindle 120 in which the positional variation is smaller than or equal to the predetermined threshold value, are output to the display device 220 or the other computer.

As a third example of the output, the processor 210 may determine the rotation speed range of the spindle 120 in which the magnitude of the positional variation is smaller than or equal to the predetermined threshold value, and may output rotation-speed-range data obtained as a result of the determination to the display device 220 or the other computer. For example, rotation speed range data of 5,000 rpm or lower, between 13,000 rpm and 14,000 rpm inclusive, and between 16,500 rpm and 17,500 rpm inclusive are output to the display device 220 or the other computer.

As a fourth example of the output, the processor 210 may determine the rotation speed range of the spindle 120 in which the magnitude of the positional variation exceeds the predetermined threshold value, unlike the third example, and may output rotation-speed-range data obtained as a result of the determination to the display device 220 or the other computer. The operator may see the display according to the first example, determine the rotation speed ranges according to the third example and the fourth example, and input the determined rotation speed ranges to the controller 200. The processor 210 may output the rotation-speed-range data obtained as a result of the determination to the display device 220 or the other computer.

As a fifth example of the output, the positional variation data illustrated in FIG. 4, the data of the analysis result in the second example, the rotation-speed-range data obtained as a result of the analysis in the second example, the rotation-speed-range data obtained as a result of the determination in the third example, and the rotation-speed-range data obtained as a result of the determination in the fourth example may be output to a server. These pieces of data are output together with data indicating the model of the machining device 100 and data related to the tool 120c. In the server, these pieces of data are stored so as to correspond to, for example, the model of the machining device 100 and the type of the tool 120c so as to be used as a reference for an analysis or a machining process in another machining device.

As a sixth example of the output, the positional variation data illustrated in FIG. 4, the data of the analysis result in the second example, the rotation-speed-range data obtained as a result of the analysis in the second example, the rotation-speed-range data obtained as a result of the determination in the third example, and the rotation-speed-range data obtained as a result of the determination in the fourth example may be stored in the storage unit 230. For example, as illustrated in FIG. 6, rotation-speed-range data obtained as a result of the determination in the third example are stored so as to correspond to the type of the tool 120c.

As a seventh example of the output, when the storing process according to the sixth example is performed, for example, machining quality data of the workpiece W corresponding to the rotation-speed-range data obtained as a result of the determination in the third example may also be stored, as illustrated in FIG. 7. The machining quality data may be obtained based on determination by an operator or determination by a quality inspection device with respect to the workpiece W machined using the rotation speeds of the spindle 120 that are within the rotation speed ranges obtained as a result of the determination. In FIG. 7, for example, a glossiness index based on the determination by the operator or the determination by the quality inspection device is stored as the machining quality data of the workpiece W. The determination according to the third example in steps S1-1 to S1-3 and step S1-4 may be performed before a plurality of workpieces W are machined, the plurality of workpieces W may be machined by using the rotation speed ranges of the spindle 120 obtained as a result of the determination in the third example, and the glossiness indices based on the determination by the operator or the determination of the quality inspection device with respect to the machined workpieces W may be stored.

As an eighth example of the output, the processor 210 may update the machining program 230a by using, for example, the data of the analysis result in the second example, the rotation-speed-range data obtained as a result of the analysis in the second example, the rotation-speed-range data obtained as a result of the determination according to the third example, the rotation-speed-range data obtained as a result of the determination according to the fourth example, the rotation-speed-range data stored in accordance with the sixth example, and the rotation-speed-range data and the machining quality data stored in accordance with the seventh example, and may store the modified machining program 230a in the storage unit 230. The modified machining program 230a in the storage unit 230 may be associated with the type of the tool 120c. Furthermore, the machining program 230a may be modified by the operator by allowing the operator to refer to, for example, the positional variation data illustrated in FIG. 4, the data of the analysis result in the second example, the rotation-speed-range data obtained as a result of the analysis in the second example, the rotation-speed-range data obtained as a result of the determination according to the third or fourth example, and the data stored in accordance with the sixth or seventh example.

As a ninth example of the output, the processor 210 may store the data obtained in accordance with the second to fourth examples in the storage unit 230 for each type of the tool 120c. For example, the rotation-speed-range data obtained as a result of the determination in the third example can be stored in the storage unit 230 so as to correspond to the type of the tool 120c.

As a tenth example of the output, the processor 210 may compare data obtained in accordance with the first to fourth examples in a state where a certain tool 120c is held by the tool holder 120b of the spindle 120 with previous data about the tool 120c stored in the storage unit 230, and may output the comparison result to the display device 220 or the other computer. In this case, the previous data is data according to the first to fourth examples obtained when the tool 120c is held the last time or earlier by the tool holder 120b.

Alternatively, the processor 210 may compare the data obtained in accordance with the first to fourth examples in a state where the certain tool 120c is held by the tool holder 120b of the spindle 120 with previous data about another tool 120c stored in the storage unit 230, and may output the comparison result to the display device 220 or the other computer. In this case, it is possible to detect an attachment error caused by a small foreign object existing between the tool 120c and the tool holder 120b, and it is also possible to detect an error in other parts of the spindle 120 if the tool 120c and the other tool 120c are similar to each other.

A spindle vibration measuring system according to a second embodiment of the present invention will be described below with reference to the drawings. In the second embodiment, the spindle 120 is rotated at a plurality of rotation speeds, instead of gradually changing the rotation speed of the spindle 120 from the predetermined low rotation speed to the predetermined high rotation speed in the first embodiment. Components not described in the second embodiment are the same as or similar to those in the first embodiment, and the same components or the similar components are given the same reference signs.

Figure 8:
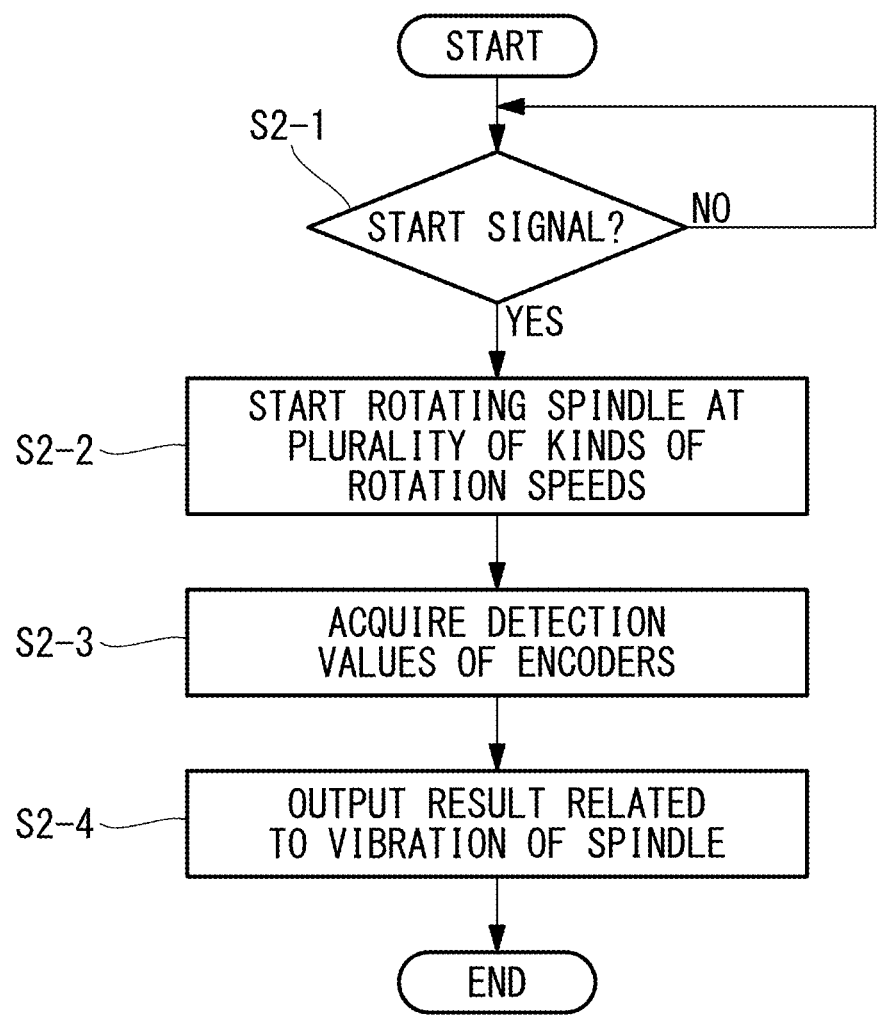
FIG. 8 is a flowchart illustrating control performed by a controller of a spindle vibration measuring system according to a second embodiment.

A process performed by the processor 210 based on the data acquisition program 230b and the processing program 230c in the second embodiment will be described with reference to a flowchart in FIG. 8.

First, in a state where the tool 120c of the spindle 120 is not in contact with the workpiece W, when the processor 210 receives a start signal based on an input to the input device 240 or a start signal received by the transmitter-receiver 250 (step S2-1), the processor 210 starts to rotate the spindle 120 based on the data acquisition program 230b (step S2-2). The processor 210 causes the spindle 120 to sequentially rotate at a plurality of rotation speeds. For example, as illustrated in FIG. 9, the processor 210 causes the spindle 120 to sequentially rotate at six rotation speeds, namely, 0 rpm, 5,000 rpm, 10,000 rpm, 15,000 rpm, 20,000 rpm, and 24,000 rpm.

In this case, based on the data acquisition program 230b, the processor 210 acquires detection values of the encoder 142a, the encoder 132a, and the encoder 102a so as to correspond to the rotation speed of the spindle 120 (step S2-3).

Figure 9:
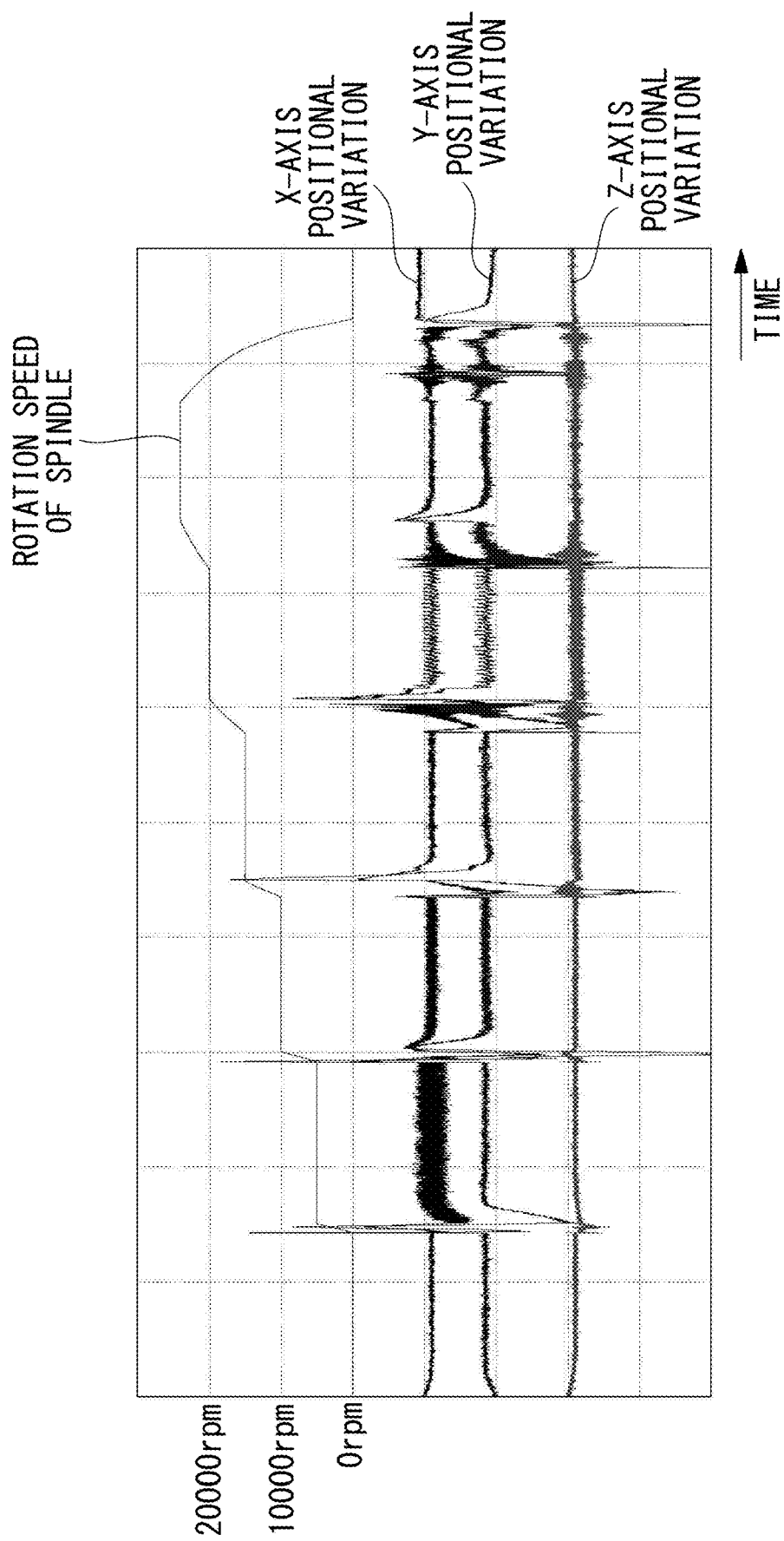
FIG. 9 is a chart illustrating an example of positional variation data obtained by the spindle vibration measuring system according to the second embodiment.

An example of data acquired in step S2-3 is illustrated in FIG. 9. In FIG. 9, the abscissa axis indicates time, and FIG. 9 illustrates an X-axis positional variation as a detection value of the encoder 142a, a Y-axis positional variation as a detection value of the encoder 132a, and a Z-axis positional variation as a detection value of the encoder 102a. Moreover, FIG. 9 also illustrates the rotation speed of the spindle 120 that changes in a stepwise manner with time.

As illustrated in FIG. 9, when the spindle 120 becomes certain rotation speeds, specifically, 5,000 rpm, 10,000 rpm, 20,000 rpm, and 24,000 rpm, the X-axis positional variation increases. The Z-axis positional variation increases at 20,000 rpm and 24,000 rpm, and the Z-axis positional variation slightly increases at 15,000 rpm. The Y-axis positional variation increases at 10,000 rpm, 20,000 rpm, and 24,000 rpm, and the Y-axis positional variation slightly increases at 15,000 rpm.

Subsequently, the processor 210 performs an output of a result related to vibration of the spindle 120 based on the processing program 230c (step S2-4).

The output may involve performing the output according to the first example of the first embodiment. Specifically, the processor 210 may output data for displaying the positional variations illustrated in FIG. 9 to the display device 220, or may output the data to another computer provided with a display.

Alternatively, the output according to the second example of the first embodiment may be performed. Specifically, the processor 210 may obtain an analysis result by performing an analysis for expressing the positional variation data in FIG. 9 as a function of the rotation speed of the spindle 120 or the frequency, and may output data for displaying the analysis result to the display device 220 or the other computer. Similar to the first embodiment, the analysis result may be a chart with an abscissa axis indicating the rotation speed of the spindle 120 and an ordinate axis indicating the magnitude of a positional variation, a rotation speed range of the spindle 120 in which the positional variation is smaller than or equal to a predetermined threshold value in the chart, and a rotation speed range of the spindle 120 in which the positional variation exceeds the predetermined threshold value in the chart.

Furthermore, an output the same as or similar to that in the third example of the first embodiment may be performed. Specifically, the processor 210 may determine the rotation speed of the spindle 120 at which the magnitude of the positional variation is smaller than or equal to the predetermined threshold value, and may output rotation-speed data obtained as a result of the determination to the display device 220 or the other computer. For example, if the X-axis positional variation has a large effect on the mirror-finishing process of the workpiece W, data of the rotation speed of 15,000 rpm is output to the display device 220 or the other computer. If the Z-axis positional variation has a large effect on the mirror-finishing process of the workpiece W, data of the rotation speeds of 5,000 rpm and 10,000 rpm are output to the display device 220 or the other computer.

Furthermore, an output the same as or similar to that in the fourth example of the first embodiment may be performed. The processor 210 may determine the rotation speed of the spindle 120 at which the positional variation exceeds the predetermined threshold value, and may output rotation-speed data obtained as a result of the determination to the display device 220 or the other computer. Alternatively, the operator may see the display according to the first example, determine the rotation speeds according to the third and fourth examples, and input the determined rotation speeds to the controller 200. The processor 210 may output the rotation-speed data obtained as a result of the determination to the display device 220 or the other computer.

Furthermore, the output to the server in the fifth example of the first embodiment, the data storage in the sixth and seventh examples, and the update of the machining program 230a in the eighth example may also be performed. In the case of the second embodiment, the term "rotation speed range" in the description of the fifth to eighth examples of the first embodiment should be interpreted as "rotation speed".

A spindle vibration measuring system according to a third embodiment of the present invention will be described below with reference to the drawings. In the third embodiment, the spindle 120 is rotated at a predetermined rotation speed, instead of gradually changing the rotation speed of the spindle 120 from the predetermined low rotation speed to the predetermined high rotation speed in the first embodiment. The predetermined rotation speed may be set in advance in accordance with the type of the tool 120c. Components not described in the third embodiment are the same as or similar to those in the first embodiment, and the similar components are given the same reference signs.

Figure 10:
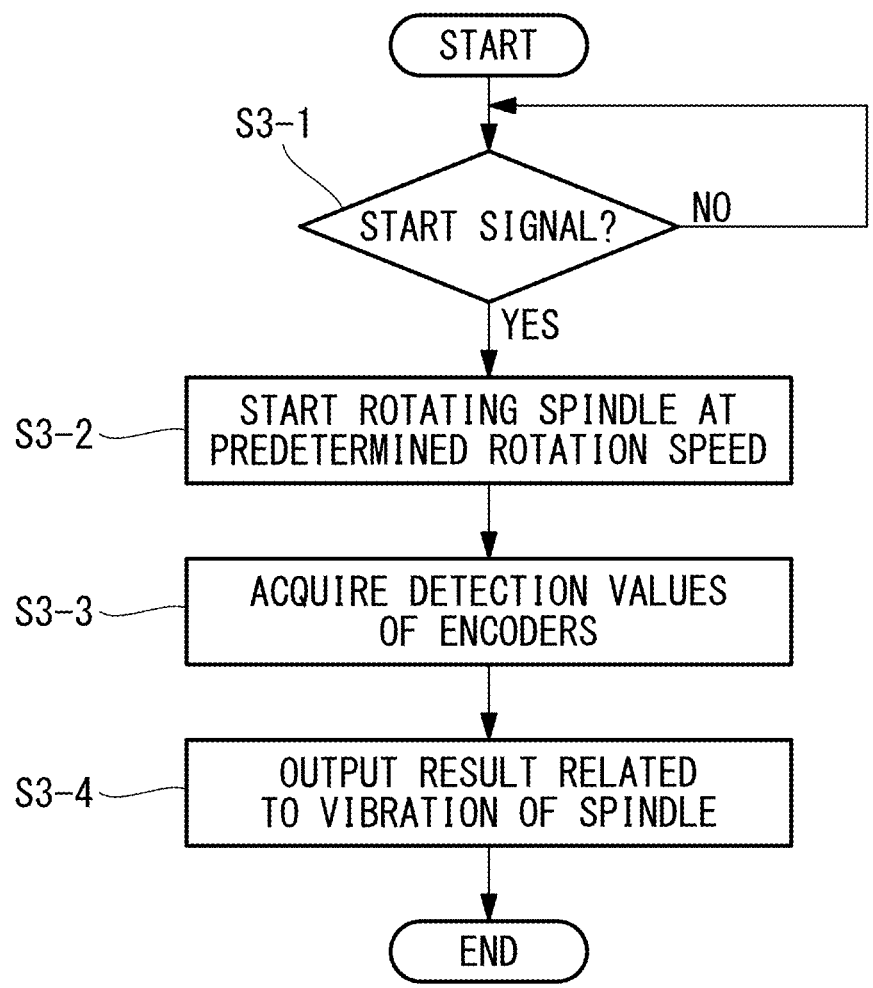
FIG. 10 is a flowchart illustrating control performed by a controller of a spindle vibration measuring system according to a third embodiment.

A process performed by the processor 210 based on the data acquisition program 230b and the processing program 230c in the third embodiment will be described with reference to a flowchart in FIG. 10.

First, in a state where the tool 120c of the spindle 120 is not in contact with the workpiece W, when the processor 210 receives a start signal based on an input to the input device 240 or a start signal received by the transmitter-receiver 250 (step S3-1), the processor 210 starts to rotate the spindle 120 based on the data acquisition program 230b (step S3-2). The processor 210 causes the spindle 120 to rotate at the predetermined rotation speed. For example, the processor 210 causes the spindle 120 to rotate at a preset rotation speed in accordance with, for example, the material of the workpiece W, the shape of the workpiece W, the type of the tool 120c, or the like.

In this case, based on the data acquisition program 230b, the processor 210 acquires detection values of the encoder 142a, the encoder 132a, and the encoder 102a (step S3-3).

Subsequently, the processor 210 performs an output of a result related to vibration of the spindle 120 based on the processing program 230c (step S3-4).

The output may involve performing the output according to the first example of the first embodiment. Specifically, the processor 210 may output data for displaying the positional variations obtained in step S3-3 to the display device 220 or the other computer.

If the positional variations obtained in step S3-3 exceed the threshold value, the output may involve outputting, to the display device 220 or the other computer, a signal for giving a notification that the positional variations exceed the threshold value.

Furthermore, the output may involve performing an output equivalent to that in the fifth example of the first embodiment. Specifically, the positional variation data obtained in step S3-3 may be output to the server. The data is output together with the data indicating the model of the machining device 100 and the data related to the tool 120c. In the server, the positional variation data is stored so as to correspond to, for example, the model of the machining device 100 and the type of the tool 120c so as to be used as a reference for an analysis or a machining process in another machining device.

Furthermore, the output may involve performing an output equivalent to that in the sixth example of the first embodiment. Specifically, the positional variation data obtained in step S3-3 may be stored in the storage unit 230. For example, the positional variation data is stored so as to correspond to the type of the tool 120c.

Furthermore, the output may involve performing an output equivalent to that in the seventh example of the first embodiment. Specifically, when the storing process according to the sixth example is to be performed, machining quality data of the workpiece W corresponding to the positional variation data obtained in step S3-3 may be further stored.

In the first embodiment and the second embodiment, if the positional variations obtained in step S1-3 and step S2-3 exceed the threshold value, the processor 210 may similarly output, to the display device 220 or the other computer, a signal for giving a notification that the positional variations exceed the threshold value.

Furthermore, in the first embodiment and the second embodiment, the operator may similarly determine the quality of a positional variation at a rotation speed corresponding to the rotation speed of the spindle 120 in the machining program 230a based on a result displayed in accordance with the first to fourth examples.

Figure 11:
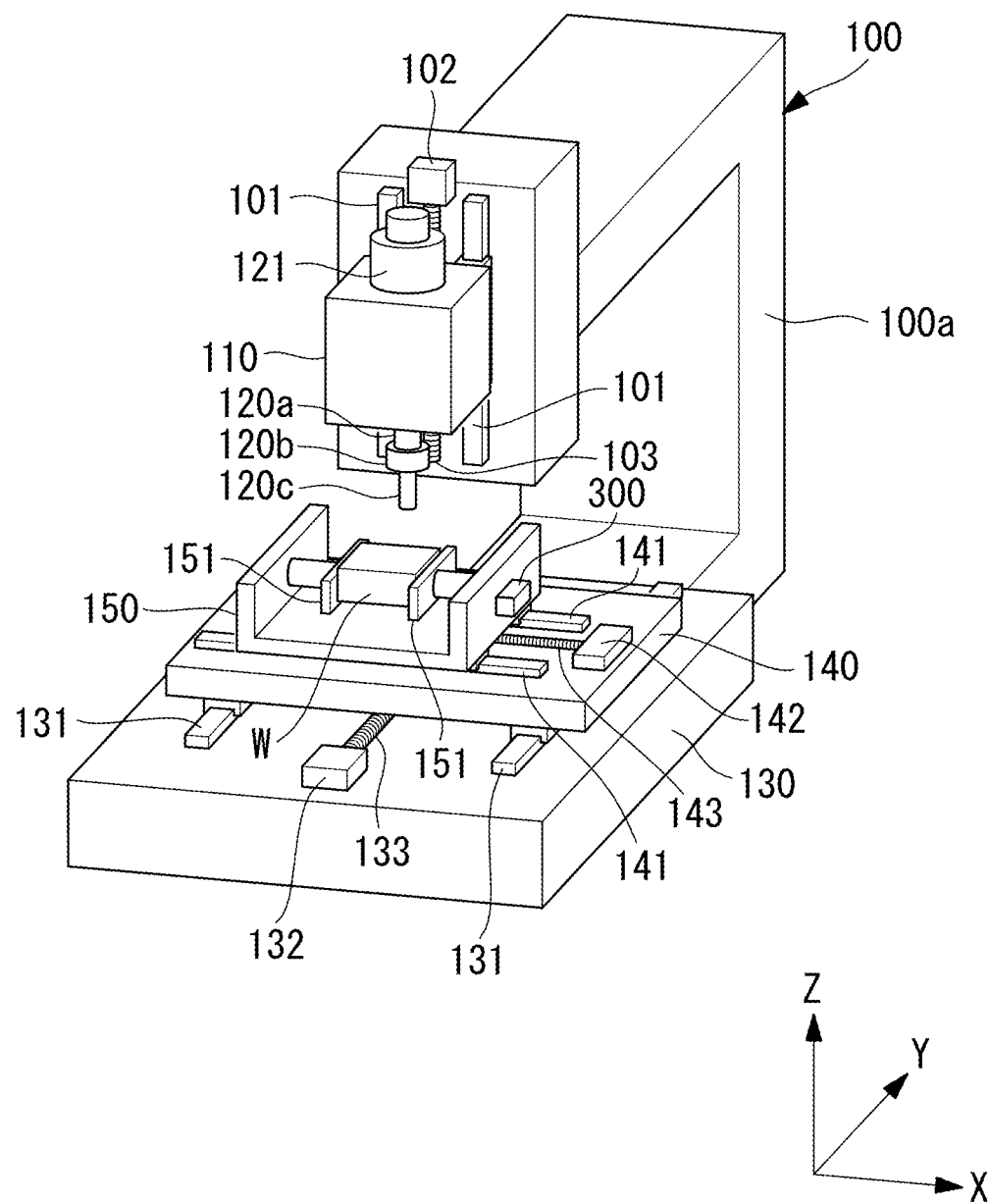
FIG. 11 is a perspective view of a machining device for illustrating a modification of the spindle vibration measuring system according to the first to third embodiments.

In the first to third embodiments, in order to acquire vibration having no effect on the servo motor, a sensor 300, such as an acceleration sensor, may be used in place of the encoders 142a, 132a, and 102a, as illustrated in FIG. 11. In this case, the sensor 300 is detachably attached to the workpiece W, the workpiece holder 150, or the movable member 140 by using a fastening member, such as an adhesive or a bolt. The sensor 300 may be, for example, a triaxial acceleration sensor or a uniaxial acceleration sensor. The sensor 300 is connected to the controller 200.

The processor 210 acquires X-axis and Y-axis vibration data of, for example, the workpiece W, the workpiece holder 150, or the movable member 140 from the sensor 300 based on the data acquisition program 230b. Specifically, in steps S1-3, S2-3, and S3-3 in the first to third embodiments, the processor 210 acquires vibration data from the sensor 300 instead of positional variation data.

In this case, an output or storage equivalent to that in the first to eighth examples can be performed by using the vibration data instead of the positional variation data.

A conceivable cause of a machining defect of the workpiece W is a relative positional variation between the tool 120c and the workpiece W. In each of the above embodiments, a relative positional variation between the tool 120c and the workpiece W is acquired as positional variation data or vibration data of the moving mechanism related to relative movement between the spindle 120 holding the tool 120c and the workpiece holder 150 holding the workpiece, and a result related to vibration of the spindle 120 is output or stored based on the acquired positional variation data or vibration data. Therefore, for example, the output result is determined by the operator or the computer, so that the cause of the machining defect can be properly ascertained and the machining conditions can be properly set.

In each of the above embodiments, the positional variation data or vibration data is acquired in a state where the tool 120c held by the spindle 120 is not in contact with the workpiece W. By employing this configuration, data related to a relative positional variation between the tool 120c and the workpiece W caused by rotation of the spindle 120 can be acquired in a state where there is no effect caused by contact between the tool 120c and the workpiece W.

The first embodiment involves acquiring positional variation data or vibration data when the spindle 120 is rotated such that the rotation speed thereof sequentially changes within a predetermined range, and determining a rotation speed range in which the vibration of the spindle 120 is larger than the threshold value or smaller than or equal to the threshold value based on the acquired positional variation data or vibration data.

The second embodiment involves acquiring positional variation data or vibration data when the spindle 120 is sequentially rotated at a plurality of predetermined rotation speeds, and determining a rotation speed range in which the vibration of the spindle 120 is larger than the threshold value or smaller than or equal to the threshold value based on the acquired positional variation data or vibration data.

By employing these configurations, a rotation speed at which the vibration of the spindle 120 is larger than the threshold value or smaller than or equal to the threshold value can be accurately ascertained by the operator or the computer, whereby the cause of a machining defect can be properly ascertained and the machining conditions can be properly set.

In each of the above embodiments, the acquired positional variation data or vibration data is compared with the positional variation data or vibration data stored in the storage unit 230, and the comparison result is output as a result related to the vibration of the spindle 120.

By employing this configuration, for example, it is possible to accurately ascertain whether or not the acquired positional variation data or vibration data has significantly changed from the previous state by being compared with the positional variation data or vibration data stored in the storage unit 230, or is significantly different from the positional data or vibration data of another similar tool 120c.

In each of the above embodiments, the positional variation data or vibration data when the spindle 120 is rotated such that the rotation speed thereof changes is acquired. Then, an analysis for expressing the acquired positional variation data or vibration data as a function of the frequency or the rotation speed of the spindle 120 is performed, and the analysis result is output or stored as a result related to the vibration of the spindle 120.

By employing this configuration, it is possible for the operator or the computer to accurately ascertain a rotation speed at which the vibration of the spindle 120 is larger than the threshold value or smaller than or equal to the threshold value, as well as the tendency of the vibration, whereby the cause of a machining defect can be properly ascertained and the machining conditions can be properly set.

In each of the above embodiments, the obtained analysis result is compared with the analysis result stored in the storage unit 230, and the comparison result is output as a result related to the vibration of the spindle 120.

By employing this configuration, for example, it is possible to accurately ascertain whether or not the newly obtained analysis result has significantly changed from the previous state by being compared with the analysis result stored in the storage unit 230, or whether or not the newly obtained analysis result is significantly different from the analysis result of another similar tool 120c.

In each of the above embodiments, the spindle 120 is capable of alternatively holding a plurality of types of tools 120c. The positional variation data or vibration data when each tool 120c is held by the spindle 120 is acquired, and a rotation speed range or a rotation speed at which the vibration of the spindle 120 is larger than the threshold value or smaller than or equal to the threshold value is stored in the storage unit 230 for each of the plurality of types of tools 120c.

By employing this configuration, it is possible for the operator or the computer to easily and reliably ascertain the rotation speed at which the vibration of the spindle 120 is larger than the threshold value or smaller than or equal to the threshold value for each of the plurality of types of tools 120c, whereby the machining conditions can be properly set.

In each of the above embodiments, the machining program 230a is modified based on the rotation speed range obtained as a result of the determination or the analysis result, and the modified machining program is stored.

By employing this configuration, the machining program 230a is automatically improved, thereby achieving improved machining quality.

The following aspects of the present invention are derived from the above disclosure.

A first aspect of the present invention provides a spindle vibration measuring system that measures vibration of a spindle in a machining device that performs a cutting or abrading process on a workpiece, the machining device having a workpiece holder that holds the workpiece, the spindle that holds a tool, and a moving mechanism that relatively moves the workpiece holder and the spindle, the spindle vibration measuring system including: a data acquisition unit which acquires positional variation data or vibration data of the moving mechanism when the spindle rotates; and a processing unit which outputs or stores a result related to vibration of the spindle based on the positional variation data or the vibration data.

One conceivable cause of a machining defect of a workpiece is a relative positional variation between the tool and the workpiece. In the first aspect, the relative positional variation between the tool and the workpiece is acquired as the positional variation data or vibration data of the moving mechanism related to relative movement between the spindle that holds the tool and the workpiece holder that holds the workpiece, and the result related to the vibration of the spindle is output or stored based on the acquired positional variation data or vibration data. Accordingly, for example, the output result is determined by the operator or the computer, whereby the cause of a machining defect can be properly ascertained and the machining conditions can be properly set.

In the above aspect, it is preferable that the data acquisition unit acquires the positional variation data or the vibration data in a state where the tool held by the spindle is not in contact with the workpiece.

By employing this configuration, data related to the relative positional variation between the tool and the workpiece caused by rotation of the spindle can be acquired in a state where there is no effect caused by contact between the tool and the workpiece.

In the above aspect, it is preferable that the data acquisition unit acquires the positional variation data or the vibration data when the spindle is rotated such that rotation speed thereof sequentially changes within a predetermined range, wherein, based on the positional variation data or the vibration data acquired by the data acquisition unit, the processing unit determines a rotation speed range in which the vibration of the spindle is larger than a threshold value or smaller than or equal to the threshold value.

In the above aspect, it is preferable that the data acquisition unit acquires the positional variation data or the vibration data when the spindle is sequentially rotated at a plurality of predetermined rotation speeds, wherein, based on the positional variation data or the vibration data acquired by the data acquisition unit, the processing unit determines a rotation speed range in which the vibration of the spindle is larger than a threshold value or smaller than or equal to the threshold value.

By employing these configurations, the rotation speed at which the vibration of the spindle is larger than the threshold value or smaller than or equal to the threshold value can be accurately ascertained by the operator or the computer, whereby the cause of a machining defect can be properly ascertained and the machining conditions can be properly set.

In the above aspect, it is preferable that the processing unit compares the positional variation data or the vibration data acquired by the data acquisition unit with positional variation data or vibration data stored in a memory, and outputs a comparison result as the result related to the vibration of the spindle.

By employing this configuration, for example, it is possible to accurately ascertain whether or not the positional variation data or vibration data acquired by the data acquisition unit has significantly changed from the previous state by being compared with the positional variation data or vibration data stored in the memory, or is significantly different from the positional data or vibration data of another similar tool.

In the above aspect, it is preferable that the data acquisition unit acquires the positional variation data or the vibration data when the spindle is rotated such that rotation speed thereof changes, wherein the processing unit performs an analysis for expressing the positional variation data or the vibration data acquired by the data acquisition unit as a function of the frequency or the rotation speed of the spindle, and outputs or stores an analysis result as the result related to the vibration of the spindle.

By employing this configuration, it is possible for the operator or the computer to accurately ascertain the rotation speed at which the vibration of the spindle is larger than the threshold value or smaller than or equal to the threshold value, as well as the tendency of the vibration, whereby the cause of a machining defect can be properly ascertained and the machining conditions can be properly set.

In the above aspect, it is preferable that the processing unit compares the analysis result with an analysis result stored in a memory, and outputs a comparison result as the result related to the vibration of the spindle.

By employing this configuration, for example, it is possible to accurately ascertain whether or not the analysis result obtained by the processing unit has significantly changed from the previous state by being compared with the analysis result stored in the memory, or whether or not the analysis result obtained by the processing unit is significantly different from the analysis result of another similar tool.

In the above aspect, it is preferable that the spindle is capable of alternatively holding a plurality of types of tools, wherein the data acquisition unit acquires the positional variation data or the vibration data when each of the tools is held by the spindle, wherein the processing unit stores, in a memory for each of the plurality of types of tools, a rotation speed range or a rotation speed at which the vibration of the spindle is larger than a threshold value or smaller than or equal to the threshold value.

By employing this configuration, it is possible for the operator or the computer to easily and reliably ascertain the rotation speed at which the vibration of the spindle is larger than the threshold value or smaller than or equal to the threshold value for each of the plurality of types of tools, whereby the machining conditions can be properly set.

In the above aspect, it is preferable that, based on the rotation speed range obtained as a result of the determination or based on the analysis result, the processing unit updates a machining program for controlling the machining device to perform the cutting or abrading process on the workpiece, and stores the modified machining program.

By employing this configuration, the machining program is automatically improved, thereby achieving improved machining quality.

A second aspect of the present invention provides a spindle vibration measuring method for measuring vibration of a spindle in a machining device that performs a cutting or abrading process on a workpiece, the machining device having a workpiece holder that holds the workpiece, the spindle that holds a tool, and a moving mechanism that relatively moves the workpiece holder and the spindle, the spindle vibration measuring method including: vibration-data acquisition for acquiring positional variation data or vibration data of the moving mechanism when the spindle rotates; and result derivation of deriving a result related to vibration of the spindle based on the positional variation data or the vibration data.

In the second aspect, it is preferable that the vibration-data acquisition includes acquiring the positional variation data or the vibration data in a state where the tool held by the spindle is not in contact with the workpiece.

In the second aspect, it is preferable that the vibration-data acquisition includes acquiring the positional variation data or the vibration data when the spindle is rotated such that rotation speed thereof sequentially changes within a predetermined range, wherein the result derivation includes deriving a rotation speed range in which the vibration of the spindle is larger than a threshold value or smaller than or equal to the threshold value based on the positional variation data or the vibration data acquired in the vibration-data acquisition.

In the second aspect, it is preferable that the result derivation includes comparing the positional variation data or the vibration data acquired in the vibration-data acquisition with positional variation data or vibration data stored in a memory, and performing determination related to the vibration of the spindle as the result related to the vibration of the spindle based on a comparison result.

In the second aspect, it is preferable that the vibration-data acquisition includes acquiring the positional variation data or the vibration data when the spindle is rotated such that rotation speed thereof changes, wherein the result derivation includes performing an analysis for expressing the positional variation data or the vibration data acquired in the vibration-data acquisition as a function of the frequency or the rotation speed of the spindle.

Furthermore, in the second aspect, it is preferable that the result deriving step include comparing a result of the analysis with an analysis result stored in a memory.

In the second aspect, it is preferable that, based on the rotation speed range obtained as a result of the derivation or based on a result of the analysis, a machining program for controlling the machining device to perform the cutting or abrading process on the workpiece is modified, and the modified machining program is stored.

A third aspect of the present invention provides a program causing a computer to execute a spindle vibration measuring process for measuring vibration of a spindle in a machining device that performs a cutting or abrading process on a workpiece, the machining device having a workpiece holder that holds the workpiece, the spindle that holds a tool, and a moving mechanism that relatively moves the workpiece holder and the spindle, the program is configured to cause the computer to execute: vibration-data acquisition for acquiring positional variation data or vibration data of the moving mechanism when the spindle rotates; and result derivation for deriving a result related to vibration of the spindle based on the positional variation data or the vibration data.

According to the aforementioned aspects, the cause of a machining defect can be properly ascertained, and the machining conditions can be properly set.

REFERENCE SIGNS LIST 100 machining device
100a frame
101 rail
102 Z-axis motor
102a encoder
103 ball screw
110 spindle support
120 spindle
120a spindle body
120b tool holder
120c tool
130 base
131 rail
132 Y-axis motor
132a encoder
133 ball screw
140 movable member
141 rail
142 X-axis motor
142a encoder
143 ball screw
150 workpiece holder
151 chuck
200 controller
210 processor
220 display device
230 storage unit 230a machining program
230b data acquisition program (data acquisition unit)
230c processing program (processing unit)
240 input device
250 transmitter-receiver
300 sensor
W workpiece

The invention claimed is:

1. A spindle vibration measuring system that measures vibration regarding a spindle in a machining device that performs a cutting or abrading process on a workpiece, the machining device having a workpiece holder that holds the workpiece, the spindle that holds a tool, and a motor that moves the workpiece holder,
wherein the spindle is capable of alternatively holding a plurality of types of tools,
wherein the spindle vibration measuring system comprises:
a data acquisition unit which acquires, in a state where the tool held by the spindle is not in contact with the workpiece, detection value data of an encoder of the motor while rotating the spindle so that rotation speed of the spindle is being increased or decreased; and
a processing unit which stores, in a memory for each of the plurality of types of tools, the detection value data of the encoder;
wherein the processing unit stores, in the memory for each of the plurality of types of tools, a rotation speed range or a rotation speed at which vibration existing in the detection value data is larger than a threshold value or smaller than or equal to the threshold value, or stores, in the memory for each of the plurality of types of tools, a specific detection value of the encoder where the vibration exists.

2. The spindle vibration measuring system according to claim 1, wherein the data acquisition unit acquires the detection value data when the spindle is rotated such that rotation speed thereof sequentially changes within a predetermined range, wherein, based on the detection value data acquired by the data acquisition unit, the processing unit determines a rotation speed range in which the vibration data of the spindle is larger than a threshold value or smaller than or equal to the threshold value.

3. The spindle vibration measuring system according to claim 1, wherein the data acquisition unit acquire the detection value data when the spindle is sequentially rotated at a plurality of predetermined rotation speeds, wherein, based on the detection value data acquired by the data acquisition unit, the processing unit determines a rotation speed range in which the vibration of the spindle is larger than a threshold value or smaller than or equal to the threshold value.

4. The spindle vibration measuring system according to claim 1, wherein the processing unit compares the detection value data acquired by the data acquisition unit with detection value data stored in a memory, and outputs a comparison result as the result related to the vibration of the spindle.

5. The spindle vibration measuring system according to claim 1, wherein the data acquisition unit acquires the detection value data when the spindle is rotated such that rotation speed thereof changes, wherein the processing unit performs an analysis for expressing the detection value data acquired by the data acquisition unit as a function of the a frequency or the a rotation speed of the spindle, and outputs or stores an analysis result as the result related to the vibration of the spindle.

6. The spindle vibration measuring system according to claim 5, wherein the processing unit compares the analysis result with an analysis result stored in a memory, and outputs a comparison result as the result related to the vibration of the spindle.

7. The spindle vibration measuring system according to claim 2, wherein, based on the rotation speed range obtained as a result of the determination, the processing unit updates a machining program for controlling the machining device to perform the cutting or abrading process on the workpiece, and stores the modified machining program.

8. A spindle vibration measuring method for measuring vibration regarding a spindle in a machining device that performs a cutting or abrading process on a workpiece, the machining device having a workpiece holder that holds the workpiece, the spindle that holds a tool, and a motor that moves the workpiece holder,
wherein the spindle is capable of alternatively holding a plurality of types of tools,
wherein the spindle vibration measuring method comprises:
vibration-data acquisition for acquiring, in a state where the tool held by the spindle is not in contact with the workpiece, detection value data of an encoder of the motor while rotating the spindle so that rotation speed of the spindle is being increased or decreased; and
storing, in a memory for each of the plurality of types of tools, the detection value data of the encoder;
wherein the processing unit stores, in the memory for each of the plurality of types of tools, a rotation speed range or a rotation speed at which vibration existing in the detection value data is larger than a threshold value or smaller than or equal to the threshold value, or stores, in the memory for each of the plurality of types of tools, a specific detection value of the encoder where the vibration exists.

9. The spindle vibration measuring method according to claim 8, wherein the vibration-data acquisition includes acquiring the detection value data when the spindle is rotated such that rotation speed thereof sequentially changes within a predetermined range, wherein the result derivation includes deriving a rotation speed range in which the vibration of the spindle is larger than a threshold value or smaller than or equal to the threshold value based on the detection value data acquired in the vibration-data acquisition.

10. The spindle vibration measuring method according to claim 8, wherein the vibration-data acquisition includes acquiring the detection value data when the spindle is sequentially rotated at a plurality of predetermined rotation speeds, wherein the result derivation includes deriving a rotation speed range in which the vibration of the spindle is larger than a threshold value or smaller than or equal to the threshold value based on the detection value data acquired in the vibration-data acquisition.

11. The spindle vibration measuring method according to claim 8, wherein the result derivation includes comparing the detection value data acquired in the vibration-data acquisition with detection value data stored in a memory, and performing determination related to the vibration of the spindle as the result related to the vibration of the spindle based on a comparison result.

12. The spindle vibration measuring method according to claim 8, wherein the vibration-data acquisition includes acquiring the detection value data when the spindle is rotated such that rotation speed thereof changes, wherein the result derivation includes performing an analysis for expressing the detection value data acquired in the vibration-data acquisition as a function of a frequency or a rotation speed of the spindle.

13. The spindle vibration measuring method according to claim 12, wherein the result derivation includes comparing a result of the analysis with an analysis result stored in a memory.

14. The spindle vibration measuring method according to claim 9, wherein, based on the rotation speed range obtained as a result of the derivation, a machining program for controlling the machining device to perform the cutting or abrading process on the workpiece is modified, and the modified machining program is stored.

15. A computer-readable storage medium that stores a program, the program configured to cause a computer to execute a spindle vibration measuring process for measuring vibration regarding a spindle in a machining device that performs a cutting or abrading process on a workpiece, the machining device having a workpiece holder that holds the workpiece, the spindle that holds a tool, and a motor that moves the workpiece holder, wherein the spindle is capable of alternatively holding a plurality of types of tools, wherein the program is configured to cause the computer to execute:

vibration-data acquisition for acquiring, in a state where the tool held by the spindle is not in contact with the workpiece, detection value data of an encoder of the motor while rotating the spindle so that rotation speed of the spindle is being increased or decreased; and storing, in a memory for each of the plurality types of tools, the detection value data of the encoder;

wherein the processing unit stores, in the memory for each of the plurality of types of tools, a rotation speed range or a rotation speed at which vibration existing in the detection value data is larger than a threshold value or smaller than or equal to the threshold value, or stores, in the memory for each of the plurality of types of tools, a specific detection value of the encoder where the vibration exists.

* * * * *